United States Patent
Dairoku et al.

(10) Patent No.: US 6,207,796 B1
(45) Date of Patent: Mar. 27, 2001

(54) PRODUCTION PROCESS FOR HYDROPHILIC POLYMER

(75) Inventors: Yorimichi Dairoku, Himeji; Koji Miyake, Akaiwa-gun; Yasuhiro Fujita; Yoshio Irie, both of Himeji, all of (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 09/436,345

(22) Filed: Nov. 9, 1999

(51) Int. Cl.$^7$ ....................................................... C08F 6/00
(52) U.S. Cl. ........................................................ 528/503
(58) Field of Search ................................................ 528/503

(56) References Cited

U.S. PATENT DOCUMENTS

| | | | |
|---|---|---|---|
| 4,920,202 | 4/1990 | Irie et al. | 528/500 |
| 5,075,344 | 12/1991 | Johnson | 521/140 |
| 5,180,804 | 1/1993 | Niessner et al. | 528/500 |

FOREIGN PATENT DOCUMENTS

| | | |
|---|---|---|
| 0412363 | 2/1991 | (EP) . |
| 0514775 | 11/1992 | (EP) . |
| 0605215 | 7/1994 | (EP) . |
| 6426606 | 1/1989 | (JP) . |
| 376719 | 4/1991 | (JP) . |
| 5-209010 | 8/1993 | (JP) . |
| 5310806 | 11/1993 | (JP) . |

Primary Examiner—Terressa M. Boykin
(74) Attorney, Agent, or Firm—Roylance, Abrams, Berdo & Goodman, L.L.P.

(57) ABSTRACT

The present invention provides a production process to obtain a hydrophilic polymer, having a low residual monomer content, with good productivity while keeping the properties of a hydrogel polymer resultant from polymerization. In a drying process for a hydrogel polymer, the hydrogel polymer is dried under normal pressure at a material temperature of not higher than 90° C. until the water content of the hydrogel polymer reduces to 15~40 weight %, and then the hydrogel polymer is kept for not shorter than 10 minutes either in a state where the change of the water content of the hydrogel polymer is within 5 weight % and where the material temperature is in the range of 70~120° C. or in a state where the water content of the hydrogel polymer is in the range of 15~40 weight % and where the material temperature is in the range of 70~120° C., and then the hydrogel polymer is finish-dried.

9 Claims, 1 Drawing Sheet

PRODUCTION PROCESS FOR HYDROPHILIC POLYMER

BACKGROUND OF THE INVENTION

A. Technical Field

The present invention relates to a production process for a hydrophilic polymer such as a water-soluble or water-swellable polymer, and, in more detail, to a process for producing a hydrophilic polymer having a low residual monomer content while retaining the properties of a hydrogel polymer resultant from polymerization.

B. Background Art

Hydrophilic polymers are represented by water-soluble polymers and water-swellable polymers. Examples of the water-soluble polymer include: sodium polyacrylate; partially hydrolyzed products of polyacrylamide; and polyvinyl alcohol. These water-soluble polymers are, for example, used for: flocculants for water treatment; mud additives for petroleum excavation; and food additives. Examples of the water-swellable polymer include: crosslinked polyacrylate salts; saponified products of acrylic acid ester-vinyl acetate copolymers; modified products of crosslinked polyvinyl alcohol; crosslinked products of partially neutralized polyacrylate salts; crosslinked products of isobutylene-maleic anhydride copolymers; and starch-acrylic acid grafted polymers. These are, for example, used for: absorbing agents for sanitary materials such as sanitary articles and disposable diapers; water-holding agents for agriculture, forestry, horticulture, and tree planting; and food-freshness-retaining films. Demand therefor is going to further enlarge in the future.

There is, however, a possibility that either unreacted residual monomers in the above hydrophilic polymers or water-soluble high molecules in the water-swellable polymer might flow out due to external pressure or with time to contact human skins or be absorbed into human bodies. Thus, serious problems might occur according to uses. In addition, there is also a danger that the above monomers or high molecules might be disposed of as wastes to flow out to the environment and then mingle into drinking water and so on again. Therefore, in recent years, demands to reduce the residual monomer content in the hydrophilic polymer or the water-soluble high-molecular content in the water-swellable polymer are getting greater and greater.

As to processes to reduce the residual monomer content in the polymer, generally, for example, there are the following proposed processes: a process in which ammonia or an amine (JP-B-33-002646 and JP-A-50-040689) or a sulfite or hydrogensulfite salt (U.S. Pat. No. 2,960,486 and JP-A-55-135110) is added to cause addition reactions of these compounds to the residual monomer, thereby reducing the residual monomer content; and a process in which a low or high temperature decomposition type polymerization initiator (JP-B-50-044280, JP-A-59-133205, and JP-A-53-141388) or a combination of a redox catalyst and an azo initiator (JP-A-50-096689 and JP-B-47-026430) is further used to polymerize the residual monomer, thereby reducing the residual monomer content. However, the addition of ammonia, the amine, or the sulfite or hydrogensulfite salt may be effective in the reduction of the residual monomer content, but, in the case where the amount of these compounds as added is small, there is no effect, and further, there are problems of toxicity of these additives themselves. In addition, the process, involving the further use of the catalyst, merely has insufficient effects.

On the other hand, in the case where a hydrogel polymer is obtained by aqueous solution polymerization of a hydrophilic monomer and then dried to produce a hydrophilic polymer, for example, there is a known process to reduce the residual monomer content comprising the step of drying the hydrogel polymer in which the hydrogel polymer is dried in the temperature range of 80~250° C. while being caused to contact water-vapor-mixed air having a dew point of 50~100° C. (JP-A-01-026604). This process, however, might need too large a drying oven. In addition, for example, there is a proposed process in which: the hydrogel polymer is partially dried, and the temperature of the gel is then raised by microwave irradiation, thereby attempting to reduce the residual monomer content (JP-A-05-209010). However, this process cannot be said to be an industrially fit process, in that either the effect to reduce the residual monomer content or the enhancement of the absorption capacity may be seen, but, in the case of the water-soluble polymer, the formation of insoluble products or the reduction of the molecular weight is involved, and further in that, in the case of the water-swellable polymer, the properties thereof are much inferior to those of the hydrogel polymer such that the increase of the water-soluble content is seen. In addition, the microwave irradiation in the drying step involves local heating of materials to change the properties of the hydrogel polymer, and further, has many problems to overcome in the future in respect to the safety of the microwave itself, the restriction of materials in the vicinity of the microwave irradiation, and high cost of devices, therefore, is not practical in the current state.

In addition, there is also a proposal of a process in which the water content is reduced from 40~70 weight % to 10~35 weight % at 60~120° C. under vacuum (JP-A-05-310806). However, the drying under vacuum involves the device cost up of the drying oven and needs a long drying time, therefore, is not practical.

As a relating technique, there is also a proposal of a process in which the hydrogel is treated with water vapor at the solid content of 20~60 weight % and the temperature of 50° C. of the hydrogel to increase the solid content by up to 30 weight %, and then conventionally dried, thus attempting to enhance the absorption capacity (JP-A-03-076719). However, this process involves the increase of the water-soluble content as well as the increase of the absorption capacity, and greatly deteriorates the properties, therefore, cannot be said to be a fit process.

SUMMARY OF THE INVENTION

A. OBJECT OF THE INVENTION

Therefore, an object of the present invention is to provide a production process to obtain a hydrophilic polymer, having a low residual monomer content, with good productivity while keeping the properties of a hydrogel polymer resultant from polymerization.

B. DISCLOSURE OF THE INVENTION

The above problems are solved by either of the following processes:

(1) a production process for a hydrophilic polymer, comprising the steps of: obtaining a hydrogel polymer by aqueous solution polymerization of a hydrophilic monomer; and then drying the hydrogel polymer; with the production process being characterized in that the drying step includes the steps of: partially drying the hydrogel polymer under normal pressure at a material temperature of not higher than 90° C. until the water content of the hydrogel polymer reduces to 15~40 weight %; and then heat-aging the hydrogel polymer by keeping the hydrogel polymer for not shorter than 10 minutes in a state where the change of the water content of the hydrogel polymer is within 5 weight % and where the material temperature is in the range of 70~120° C.; and then finish-drying the hydrogel polymer until the water content of the hydrogel polymer reduces to a desired value; and (2) a production process for a hydrophilic polymer, comprising the steps of: obtaining a hydrogel polymer by aqueous solution polymerization of a hydrophilic monomer; and then drying the hydrogel polymer; with the production process being characterized in that the drying step includes the steps of: partially drying the hydrogel polymer under normal pressure at a material temperature of not higher than 90° C. until the water content of the hydrogel polymer reduces to 15~40 weight %; and then heat-aging the hydrogel polymer by keeping the hydrogel polymer for not shorter than 10 minutes in a state where the water content of the hydrogel polymer is in the range of 15~40 weight % and where the material temperature is in the range of 70~120° C.; and then finish-drying the hydrogel polymer until the water content of the hydrogel polymer reduces to a desired value.

These and other objects and the advantages of the present invention will be more fully apparent from the following detailed disclosure.

DETAILED DESCRIPTION OF THE INVENTION

Figure 1:
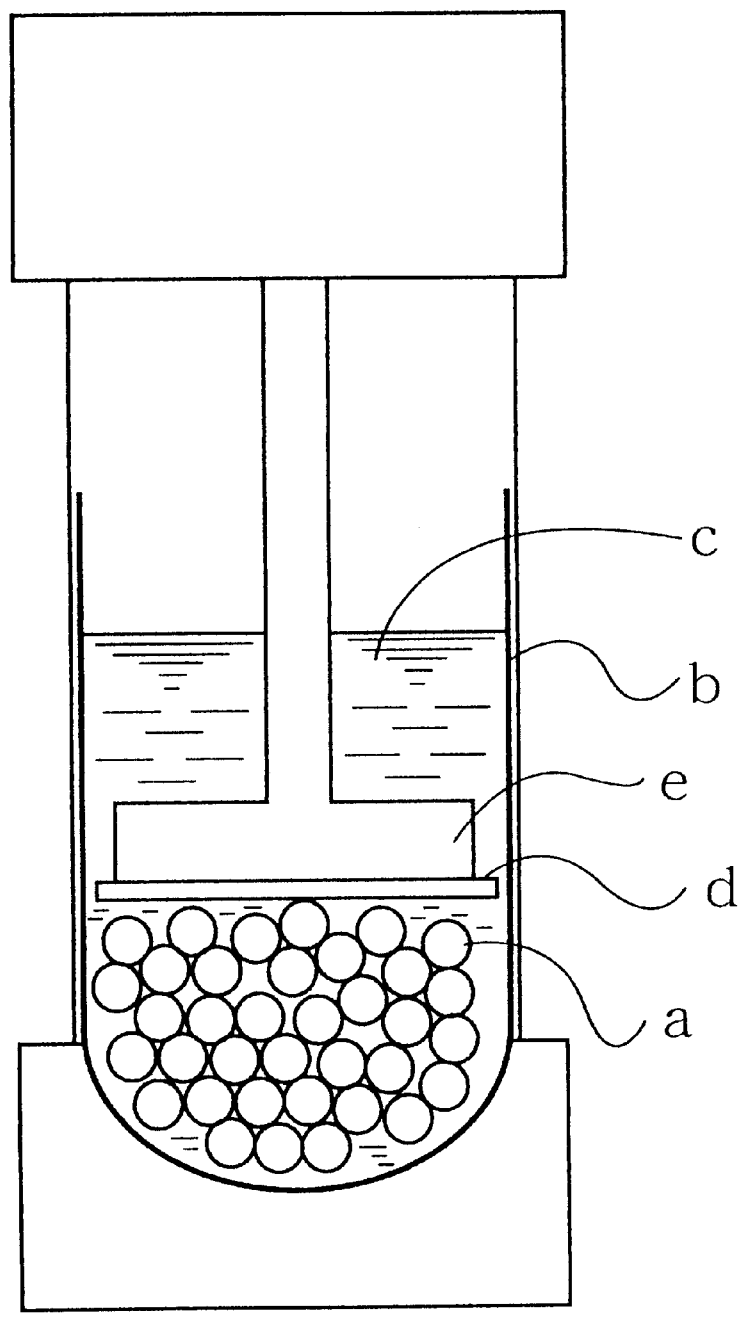
FIG. 1 is a schema of the device as used to measure the swollen-gel pressure in the Examples.

The hydrogel polymer to be dried in the present invention is a water-soluble or water-swellable hydrogel as obtained by aqueous solution polymerization of a hydrophilic monomer, and contains the unreacted residue of the monomer. If necessary, this hydrogel polymer may be a particulate hydrogel polymer as divided into small pieces to ensure a surface area needed for drying.

Examples of such a hydrogel polymer include:

(1) as is disclosed in JP-B-48-042466, a product by placing an aqueous monomer solution into a formwork, and then polymerizing the solution, and then pulverizing the resultant hydrogel polymer with a device, such as a meat chopper, an extruder, or a kneader, to divide the hydrogel polymer into small pieces;

(2) as is disclosed in JP-A-57-034101 and JP-A-10-067805, a small divided product of a hydrogel polymer by polymerization in a device such as a kneader that contains agitation vanes which can divide the resultant hydrogel polymer into small pieces; and (3) as is disclosed in JP-A-58-049714, a product by carrying out polymerization on a belt conveyer and then, if necessary, pulverizing the resultant hydrogel polymer with a device, such as a meat chopper, an extruder, or a kneader, to divide the hydrogel polymer into small pieces.

Examples of the hydrophilic monomer, as used for obtaining the hydrogel polymer in the present invention, include: (meth)acrylic acid, or alkaline metal or ammonium salts thereof; (meth)acrylamide; (meth)acrylonitrile; unsaturated dibasic adds such as maleic acid and fumaric acid, or half esters of these unsaturated dibasic acids, or alkaline metal or ammonium salts of these dibasic adds or half esters; unsaturated sulfonic adds such as 2-acrylamido-2-methylpropanesulfonic add and 2-(meth)acryloylethanesulfonic acid, or alkaline metal or ammonium salts thereof; and 2-hydroxyethyl (meth)acrylate and 2-hydroxypropyl (meth)acrylate. These may be used either alone respectively or in combinations with each other. In addition, monomers other than the hydrophilic monomers, such as methyl (meth)acrylate, ethyl (meth)acrylate, butyl (meth)acrylate, vinyl acetate, and vinyl propionate, may be used in such an amount as not to extremely damage the hydrophilicity of the resultant hydrogel polymer. Furthermore, when a hydrogel polymer of the water-swellable polymer is produced, a crosslinking agent may be jointly used with the above hydrophilic monomer. Examples of the crosslinking agent include ethylene glycol diacrylate, ethylene glycol dimethacrylate, diethylene glycol diacrylate, diethylene glycol dimethacrylate, triethylene glycol diacrylate, triethylene glycol dimethacrylate, poly ethylene glycol diacrylate, poly ethylene glycol dimethacrylate, trimethylolpropane triacrylate, trimethylolpropane trimethacrylate, pentaerythritol triacrylate, pentaerythritol trimethacrylate, N,N-methylenebisacrylamide, triallyl isocyanurate, pentaerythritol diacrylate, and pentaerythritol dimethacrylate.

The polymerization for obtaining the hydrogel polymer is the aqueous solution polymerization of the hydrophilic monomer, and is generally achieved by dissolving a hydrophilic monomer component, a polymerization initiator, and a crosslinking agent (as used if necessary) into water, and then degassing the resultant aqueous hydrophilic monomer solution with an inert gas such as nitrogen gas, and then carrying out a polymerization process of which examples include: as is disclosed in JP-B-48-042466, a casting polymerization process in which the aqueous monomer solution is placed into a formwork to polymerize the solution; as is disclosed in JP-A-58-049714, a process in which the polymerization is carried out on a belt conveyer; and, as is disclosed in JP-A-57-034101, a process in which the polymerization is carried out in a device such as a kneader that contains agitation vanes which can divide the resultant hydrogel polymer into small pieces. The polymerization initiator is usable without especial limitation, and examples thereof include ammonium persulfate, potassium persulfate, sodium persulfate, hydrogen peroxide, and 2,2'-azobis(2-amidinopropane) dihydrochloride. In addition, redox initiators, which are combinations of the above initiators with reducing agents such as sodium hydrogensulfite, L-ascorbic acid, and ferrous salts, are also usable. However, it is preferable to use the combinations of the persulfate salts with the reducing agents, if necessary, because: the persulfate salts have so high pyrolysis temperature as to easily remain even in the hydrogel polymer resultant from the polymerization, therefore, if they are reacted with residual monomers, the residual monomer content can be reduced.

The water content of the hydrogel polymer is preferably in the range of 80~60 weight %. The water content of the hydrogel polymer can be adjusted with the concentration of the aqueous hydrophilic monomer solution.

The amount of the polymerization initiator, as used relative to the monomer, is in the range of usually 0.0001~3 weight %, preferably 0.0002~2 weight %, for the water-soluble polymer, and in the range of usually 0.01~2 weight %, preferably 0.05~1 weight %, for the water-swellable polymer.

When carrying out the present invention, the hydrogel polymer as obtained by polymerization might be an already disintegrated one, but, in many cases, the hydrogel polymer needs to be small divided so as to be easy to dry. Examples of effective methods for the small division include disintegration with a device such as a meat chopper, an extruder, or a kneader.

The residual monomer content of the hydrogel polymer is usually not lower than 1,000 ppm, but the drying process according to the present invention involves the use of a hydrogel polymer having a residual monomer content of usually not lower than 10,000 ppm, preferably not lower than 20,000 ppm, more preferably not lower than 30,000 ppm, most preferably not lower than 40,000 ppm. An attempt to reduce the residual monomer content only by polymerization would result in so long a polymerization time as to deteriorate the productivity. In addition, an attempt to reduce the residual monomer content using a large amount of polymerization initiator would result in the deterioration of the properties, such as decrease of the absorption capacity under no load or increase of the extractable content, of the resultant water-absorbent resin. Thus, from the standpoint of the productivity or the resultant properties, it is preferable to stop the polymerization in a state where a large amount of monomer remains, and to then carry out the drying step.

The present invention is achieved by a drying process for a hydrogel polymer which comprises the steps of: drying the hydrogel polymer under normal pressure at a material temperature of not higher than 90° C. until the water content of the hydrogel polymer reduces to 15~40 weight % (partial drying step); and then heat-aging the hydrogel polymer by keeping the hydrogel polymer for not shorter than 10 minutes either in a state where the change of the water content of the hydrogel polymer is within 5 weight % and where the material temperature is in the range of 70~120° C. or in a state where the water content of the hydrogel polymer is in the range of 15~40 weight % and where the material temperature is in the range of 70~120° C. (heat-aging step); and then finish-drying the hydrogel polymer until the water content of the hydrogel polymer reduces to a desired value (finish-drying step).

The partial drying step is carried out under normal pressure, when the material temperature is not higher than 90° C., preferably not higher than 80° C. The case where the material temperature is higher than 90° C. has the disadvantage of increasing the residual monomer content or deteriorating the hydrogel. In addition, the drying under vacuum involves the device cost up of the drying oven and needs a long drying time, therefore, is not practical. The partial drying step is carried out until the water content of the hydrogel polymer reduces to 15~40 weight %, preferably to 20~35 weight %. In the case where the water content is higher than 40 weight % at the end of the partial drying step, the effect to reduce the residual monomer content in the subsequent heat-aging step is insufficient, and further, the hydrogel polymer is greatly deteriorated and the extractable content increases. On the other hand, in the case where the water content is lower than 15 weight % at the end of the partial drying step, the effect to reduce the residual monomer content is poor.

The heat-aging step, which is to keep the hydrogel polymer for not shorter than 10 minutes either in a state where the change of the water content of the hydrogel polymer is within 5 weight % and where the material temperature is in the range of 70~120° C. or in a state where the water content of the hydrogel polymer is in the range of 15~40 weight % and where the material temperature is in the range of 70~120° C., can be realized, for example, by heating the hydrogel polymer in an airtight vessel to suppress the drying, or by lessening the wind amount in the case of hot-air drying, or by filling the drying oven with water vapor. In this step, the material temperature is in the range of 70~120° C., preferably 80~100° C. The case where the material temperature exceeds 120° C. would result in the great deterioration of the polymer and in the increase of the water-soluble polymer content. In addition, the case where the material temperature is lower than 70° C. would consume too long a time to reduce the residual monomer content, therefore this case is not practical. In addition, the aging period of time is not shorter than 10 minutes, preferably not shorter than 20 minutes. In the case where the aging period of time is shorter than 10 minutes, the effect to reduce the residual monomer content is insufficient. In addition, during the heat-aging step, the water content is kept in the range of 15~40 weight %, preferably 20~35 weight %, or the change of the water content is kept within 5 weight %, preferably within 4 weight %. The case, where the water content exceeds 40 weight % or reduces below 15 weight %, or where the change of the water content exceeds 5 weight %, would result in the increase of the residual monomer content and in the great deterioration of the hydrogel polymer.

The material which has been subjected to the heat-aging step can be finish-dried until the water content reduces to a desired value, when the drying temperature is preferably in the range of 80~250° C., more preferably 80~170° C. for preventing the deterioration of the hydrogel polymer. In addition, it might be effective to elevate the drying temperature as the water content decreases. Herein, the drying temperature is either the temperature of the gas, as used, or the temperature of the material to be dried. The desired water content can fitly be set according to the object, but is usually in the range of 0~10 weight %, preferably 3~7 weight %.

The form of the drying oven, as used in the present invention, is not especially limited, but examples thereof include conductive heat-transfer drying ovens, radiative heat-transfer drying ovens, and hot-air heat-transfer drying ovens. In view of the drying efficiency, the hot-air heat-transfer drying oven (hereinafter referred to as "hot-air drying oven") is particularly preferable for the steps as particularly aimed at drying, such as the partial drying step, the finish-drying step, and later steps. Examples of the hot-air drying oven include devices of the following types: through-flow band type, through-flow rotary type, through-flow tower type, parallel-flow band type, through-flow tunnel type, through-flow channel stirring type, fluidized-bed type, gas current type, and spray type. Examples of the radiative heat-transfer type device include infrared and far-infrared drying ovens. In addition, examples of the conductive heat-transfer type device include paddle dryers and drum dryers. The gas as used for drying is not especially limited, but examples thereof include air, nitrogen, carbon dioxide, helium, and water vapor.

In the present invention, the hydrogel polymer is dried to obtain the aimed hydrophilic polymer. After being dried, the hydrogel polymer is pulverized, and then classified (if necessary), and then, preferably in the case of the water-swellable polymer, subjected to a surface-crosslinking treatment by a conventional method.

The surface-crosslinking treatment is, for example, carried out as follows: particles of the water-swellable polymer are mixed with a surface-crosslinking agent which is reactable with functional groups (e.g. acidic groups) of surfaces of the water-swellable polymer particles; and then, if necessary according to the type of the surface-crosslinking agent, the resultant mixture is heated; thus crosslinking the surface neighborhood. The amount of the surface-crosslinking agent, as used, is preferably in the range of 0.01~10 weight parts, more preferably 0.5~5 weight parts, per 100 weight parts of the water-swellable polymer.

Examples of the surface-crosslinking agent include: polyhydric alcohol compounds such as ethylene glycol, diethylene glycol, propylene glycol, triethylene glycol, tetraethylene glycol, polyethylene glycol, 1,3-propanediol, dipropylene glycol, 2,2,4-trimethyl-1,3-pentanediol, polypropylene glycol, glycerol, polyglycerol, 2-butene-1,4-diol, 1,3-butanediol, 1,4-butanediol, 1,5-pentanediol, 1,6-hexanediol, 1,2-cyclohexanedimethanol, 1,2-cyclohexanol, trimethylolpropane, diethanolamine, triethanolamine, polyoxypropylene, oxyethylene-oxypropylene block copolymer, pentaerythritol and sorbitol; polyepoxy compounds such as ethylene glycol diglycidyl ether, polyethylene diglycidyl ether, glycerol polyglycidyl ether, diglycerol polyglycidyl ether, polyglycerol polyglycidyl ether, propylene glycol diglycidyl ether, polypropylene glycol diglycidyl ether and glycidol; polyamine compounds, such as ethylenediamine, diethylenetriamine, triethylenetetramine, tetraethylenepentamine, pentaethylenehexamine and polyethylenimine, and their inorganic or organic salts (for example, azetidinium salts); polyisocyanate compounds such as 2,4-tolylene diisocyanate and hexamethylene diisocyanate; polyoxazoline compounds such as 1,2-ethylenebisoxazoline; alkylene carbonate compounds such as 1,3-dioxolan-2-one, 4-methyl-1,3-dioxolan-2-one, 4,5-dimethyl-1,3-dioxolan-2-one, 4,4-dimethyl-1,3-dioxolan-2-one, 4-ethyl-1,3-dioxolan-2-one, 4-hydroxymethyl-1,3-dioxolan-2-one, 1,3-dioxan-2-one, 4methyl-1,3-dioxan-2-one, 4, 6-dimethyl-1,3-dioxan-2-one and 1,3-dioxopan-2-one; haloepoxy compounds, such as epichlorohydrin, epibromohydrin and α-methylepichlorohydrin, and their polyamine adducts (for example, Kymene made by Hercules: registered trademark); silane coupling agents such as γ-glycidoxypropyltrimethoxysilane and γ-aminopropyltriethoxysilane; and polyvalent metallic compounds such as hydroxides and chlorides of zinc, calcium, magnesium, aluminum, iron and zirconium. Among them, the polyhydric alcohol compounds, the polyepoxy compounds, the alkylene carbonate compounds, and the polyvalent metallic compounds are preferable. These surface-crosslinking agents may be used either alone respectively or in combinations with each other.

(Effects and Advantages of the Invention):

The process according to the present invention can produce a hydrophilic polymer, having a low residual monomer content, with good productivity while keeping the properties of a hydrogel polymer resultant from polymerization, that is to say, preventing the polymer from being deteriorated due to drying. Particularly, in the case where the hydrophilic polymer is a water-absorbent resin, the drying step can keep the absorption capacity change ratio not higher than 10 under no load and the extractable content change ratio not higher than 100, and further, can reduce the residual monomer content to not higher than 300 ppm.

The hydrophilic polymer, as produced by the process according to the present invention, has little bad influence upon human bodies or environment, and is favorably used, for example, for the following purposes: flocculants for water treatment; mud additives for petroleum excavation; food additives; absorbing agents for sanitary materials; water-holding agents; and food-freshness-retaining films.

DETAILED DESCRIPTION OF THE PREFERRED EMBODIMENTS

Hereinafter, the present invention is more specifically illustrated by the following examples of some preferred embodiments in comparison with comparative examples not according to the invention. However, the invention is not limited to these examples.

In the present invention, the water content, the solid content, the absorption capacity under no load, the extractable content, the residual monomer content, the absorption capacity under a load, and the swollen-gel pressure were measured by the following methods.

(a) Water content:

About 2.0 g of either a particulate hydrogel polymer, as converted into small particles of not greater than 1 mm, or a powder of 300~500 μm was weighted out, and then placed into a foil container, and then dried at 180° C. for 5 hours to determine the water content from the resultant dry weight as follows:

Water content (weight %)={(weight before drying)−(weight after drying)}/(weight before drying)×100      (b) Solid content:

Solid content (weight %)=100−(water content) (weight %)

(c) Absorption capacity under no load:

W1 (g) (about 0.2 g as 100 % solid content) of either a particulate hydrogel polymer, as converted into small particles of not greater than 1 mm, or a powder, as classified into 300~500 μm by pulverization, (both of which had a solid content of A (weight %)) was placed into a nonwoven-fabric-made bag (60 mm×60 mm) and then immersed into a 0.9 weight % aqueous sodium chloride solution. Sixteen hours later, the bag was drawn up and then drained at 250 G for 3 minutes with a centrifuge, and the resultant weight W2 (g) of the bag was then measured. In addition, the same procedure was carried out using none of the samples (hydrogel and powder), in other words, using only the bag, and the resultant weight W0 (g) of the bag was then measured. Thus, the absorption capacity under no load was calculated from these weights W1, W2 and W0 in accordance with the following equation:

Absorption capacity under no load (g/g)=(W2−W0)/W1×(100/A)−1

(d) Extractable content (water-soluble polymer content):

W3 (g) (about 0.5 g as 100 % solid content) of either a particulate hydrogel polymer, as converted into small particles of not greater than 1 mm, or a powder, as classified into 300~500 μm by pulverization, (both of which had a solid content of A (weight %)) was dispersed into 1,000 g of deionized water, and then stirred for 16 hours. The resultant mixture was filtered with filter paper, and 50 g of the resultant filtrate was placed into a beaker of 100 ml. Thereto, 1 ml of 0.1 N aqueous sodium hydroxide solution, 10 ml of N/200 aqueous methyl glycol chitosan solution, and 5 drops of 0.1 weight % aqueous Toluidine Blue solution were added, and then the resultant solution in the above beaker was subjected to colloidal titration with an N/400 aqueous potassium polyvinyl sulfate solution, when the point at which the color of the solution had changed from blue to reddish violet was regarded as the end point to determine the titration amount B (ml). In addition, the same procedure was carried out using 50 g of deionized water in place of 50 g of the filtrate to determine the titration amount C (ml) as the blank. Then, the extractable content (weight %) was calculated from these titration amounts B and C and the molecular weight D of the monomer constituting the polymer in accordance with the following equation:

Extractable content (weight %)=(C−B)×0.005×D/W3×(100/A)

(e) Absorption capacity change ratio under no load:

When the absorption capacity of the hydrogel polymer under no load was regarded as GV0, and when the absorption capacity of either the dried hydrogel or the powder under no load was regarded as GV1, the absorption capacity change ratio under no load was calculated in accordance with the following equation involving the absolute value:

Absorption capacity change ratio under no load (%) =|GV0−GV1|/GV0×100

(f) Extractable content change ratio:

When the extractable content of the hydrogel polymer was regarded as Ext0, and when the extractable content of either the dried hydrogel or the powder was regarded as Ext1, the extractable content change ratio was calculated in accordance with the following equation involving the absolute value:

Extractable content change ratio (%)=|Ext0−Ext1|/Ext0×100

(g) Residual monomer content:

Either about 3 g (about 0.5 g as 100 % solid content) of a particulate hydrogel polymer, as converted into small particles of not greater than 1 mm, or about 0.5 g of a powder, as classified into 300~500 μm by pulverization, (both of which had a solid content of A (weight %)) was dispersed into 1,000 g of deionized water, and then stirred for 16 hours. The resultant mixture was filtered with filter paper, and the monomer content in the resultant filtrate was measured by high performance chromatography to quantify the residual monomer content in the hydrogel polymer or the pulverized powder.

(h) Absorption capacity under load:

The surface-crosslinked water-absorbent resin was allowed to absorb artificial urine under a load of 0.7 psi for 1 hour, and the resultant amount of the absorption was divided by the weight of the water-absorbent resin to determine the absorption capacity under the load, wherein the artificial urine was an aqueous solution containing sodium sulfate of 0.2 weight %, potassium chloride of 0.2 weight %, magnesium chloride hexahydrate of 0.05 weight %, calcium chloride dihydrate of 0.025 weight %, ammonium dihydrogenphosphate of 0.035 weight %, and diammonium hydrogenphosphate of 0.015 weight % in concentration respectively.

(i) Swollen-gel pressure:

The measurement was made with a measurement device having a structure of FIG. 1 (Accuforce Cadet Force Gage (digital force gage), made by The Crown Tool and Supply Company) in the following way. An amount of 0.358 g of water-absorbent resin a, as classified into 300~600 μm, was placed into a cell b for FISHER ELECTRO-PHOTOMETER, and 10 g of artificial urine c having an adjusted temperature of 25° C. was also placed into the above cell b. A polyethylene-made lid d was floated in the cell, and a disk e was piled up on the lid d. Then, 10 g of artificial urine c was further added, and the value was read 30 minutes after the water-absorbent resin a (swollen gel) that had absorbed the artificial urine c had reached the lid d, thus calculating the swelling pressure (Kdynes/cm$^2$) in accordance with the equation below. The artificial urine was the same as used to measure the absorption capacity under the load.

Swelling pressure (Kdynes/cm$^2$)=read graduation (g)×981/3.8/1,000

(PRODUCTION EXAMPLE 1)

An aqueous monomer solution, comprising 204 g of acrylic acid, 496 g of sodium acrylate, 1.6 g of polyethylene glycol diacrylate, and 1,286 g of water, was placed into a stainless vat of 220 mm×300 mm, and then air in the reaction system was displaced with nitrogen while the temperature of the solution was kept at 20° C. Next, while the aqueous monomer solution was stirred with a magnetic stirrer, thereto 3 g of 5 weight % aqueous V-50 (2,2'-azobis(2-amidinopropane) dihydrochloride, made by Wako Pure Chemical Industries, Ltd.) solution, 3 g of 5 weight % aqueous sodium persulfate solution, 3 g of 0.5 weight % aqueous sodium L-ascorbate solution, and 3.5 g of 0.35 weight % aqueous hydrogen peroxide solution were added as polymerization initiators. About 1 minute later than the addition of the polymerization initiators, a polymerization reaction started. The stainless vat was cooled for 20 minutes by immersion into a water bath of 20° C., and then aging was made with warm water of 60° C. for 10 minutes. The resultant polymer gel was divided with a meat chopper (made by Hiraga Seisakusho Co., Ltd.), thus obtaining a particulate hydrogel of about 3 mm in average particle diameter and of 65 weight % in water content.

(PRODUCTION EXAMPLE 2)

An aqueous monomer solution, comprising 204 g of acrylic acid, 496 g of sodium acrylate, 1.6 g of polyethylene glycol diacrylate, and 1,286 g of water, was placed into a stainless vat of 220 mm×300 mm, and then air in the reaction system was displaced with nitrogen while the temperature of the solution was kept at 20° C. Next, while the aqueous monomer solution was stirred with a magnetic stirrer, thereto 3 g of 5 weight % aqueous V-50 solution, 3 g of 5 weight % aqueous sodium persulfate solution, 3 g of 0.5 weight % aqueous sodium L-ascorbate solution, and 3.5 g of 0.35 weight % aqueous hydrogen peroxide solution were added as polymerization initiators. About 1 minute later than the addition of the polymerization initiators, a polymerization reaction started. The stainless vat was cooled for 20 minutes by immersion into a water bath of 20° C., and then aging was made with warm water of 60° C. for 40 minutes. The resultant polymer gel was divided with a meat chopper (made by Hiraga Seisakusho Co., Ltd.), thus obtaining a particulate hydrogel of about 3 mm in average particle diameter and of 65 weight % in water content.

(PRODUCTION EXAMPLE 3)

An aqueous monomer solution, comprising 204 g of acrylic acid, 496 g of sodium acrylate, 1.6 g of polyethylene glycol diacrylate, and 1,286 g of water, was placed into a stainless vat of 220 mm×300 mm, and then air in the reaction system was displaced with nitrogen while the temperature of the solution was kept at 20° C. Next, while the aqueous monomer solution was stirred with a magnetic stirrer, thereto 3 g of 5 weight % aqueous V-50 solution, 6 g of 5 weight % aqueous sodium persulfate solution, 3 g of 0.5 weight % aqueous sodium L-ascorbate solution, and 3.5 g of 0.35 weight % aqueous hydrogen peroxide solution were added as polymerization initiators. About 1 minute later than the addition of the polymerization initiators, a polymerization reaction started. The stainless vat was cooled for 20 minutes by immersion into a water bath of 20° C., and then aging was made with warm water of 60° C. for 30 minutes. The resultant polymer gel was divided with a meat chopper (made by Hiraga Seisakusho Co., Ltd.), thus obtaining a particulate hydrogel of about 3 mm in average particle diameter and of 65 weight % in water content.

(PRODUCTION EXAMPLE 4)

An aqueous monomer solution, comprising 204 g of acrylic acid, 496 g of sodium acrylate, 1.6 g of polyethylene glycol diacrylate, and 1,286 g of water, was placed into a stainless vat of 220 mm×300 mm, and then air in the reaction system was displaced with nitrogen while the temperature of the solution was kept at 20° C. Next, while the aqueous monomer solution was stirred with a magnetic stirrer, thereto 3 g of 5 weight % aqueous V-50 solution, 9 g of 5 weight % aqueous sodium persulfate solution, 3 g of 0.5 weight % aqueous sodium L-ascorbate solution, and 3.5 g of 0.35 weight % aqueous hydrogen peroxide solution were added as polymerization initiators. About 1 minute later than the addition of the polymerization initiators, a polymerization reaction started. The stainless vat was cooled for 20 minutes by immersion into a water bath of 20° C., and then aging was made with warm water of 60° C. for 30 minutes. The resultant polymer gel was divided with a meat chopper (made by Hiraga Seisakusho Co., Ltd.), thus obtaining a particulate hydrogel of about 3 mm in average particle diameter and of 65 weight % in water content.

(PRODUCTION EXAMPLE 5)

A cap was attached to a jacketed stainless twin-arm type kneader of 10 liters in capacity and of 240 mm in depth having an opening portion of 220 mm×260 mm and two sigmoidal vanes of 120 mm in rotational diameter. Then, an aqueous monomer solution, comprising 408 g of acrylic acid, 992 g of sodium acrylate, 3.2 g of polyethylene glycol diacrylate, and 2,572 g of water, was placed into the kneader, and then air in the reaction system was displaced with nitrogen while the liquid temperature of the aqueous monomer solution was kept at 25° C. by circulating warm water of 25° C. through the jacket. Next, while the aqueous monomer solution was stirred at 40 rpm with the two sigmoidal vanes, thereto 6 g of 5 weight % aqueous V-50 solution, 6 g of 5 weight % aqueous sodium persulfate solution, 6 g of 0.5 weight % aqueous sodium L-ascorbate solution, and 7 g of 0.35 weight % aqueous hydrogen peroxide solution were added as polymerization initiators. After the addition of the polymerization initiators, a polymerization reaction started in about 1 minute, and the temperature in the reaction system reached its peak in 15 minutes, when the temperature was 63° C. Then, the temperature of the warm water in the jacket was raised to 60° C. to carry out aging for 10 minutes. Then, the resultant polymer gel was divided with a meat chopper (made by Hiraga Seisakusho Co., Ltd.), thus obtaining a particulate hydrogel of about 3 mm in average particle diameter and of 65 weight % in water content.

(PRODUCTION EXAMPLE 6)

A particulate hydrogel was obtained in the same way as of Production Example 1 except that the amount of polyethylene glycol diacrylate, as used, was changed to 0.8 g.

(PRODUCTION EXAMPLE 7)

An aqueous monomer solution, comprising 184 g of acrylic acid, 1,611 g of 37 weight % aqueous sodium acrylate solution, 4.3 g of polyethylene glycol diacrylate, and 194 g of water, was placed into a stainless vat of 220 mm×300 mm, and then air in the reaction system was displaced with nitrogen while the temperature of the solution was kept at 18° C. Next, while the aqueous monomer solution was stirred with a magnetic stirrer, thereto 5.3 g of 20 weight % aqueous sodium persulfate solution and 1.6 g of 5 weight % aqueous sodium L-ascorbate solution were added as polymerization initiators. About 1 minute later than the addition of the polymerization initiators, a polymerization reaction started. The stainless vat was cooled for 12 minutes by immersion into a water bath of 10° C., and then aging was made with warm water of 80° C. for 10 minutes. The resultant polymer gel was divided with a meat chopper (made by Hiraga Seisakusho Co., Ltd.), thus obtaining a particulate hydrogel of about 2 mm in average particle diameter and of 60 weight % in water content.

(EXAMPLE 1)

An amount of 1 kg of the particulate hydrogel as obtained in Production Example 1 was statically dried for 20 minutes at a wind speed of 1 m/sec and a temperature of 80° C. with a through-flow batch type drying oven (71-S6, made by Satake Kagaku Kikai Kogyo Co., Ltd.) (partial drying step). A thermometer was stuck into the central portion of the resultant lumpish aggregate to measure the material temperature, which was 70° C. In addition, the water content was 25 weight %. Next, the resultant aggregated semidry product was placed into a stainless beaker, and this vessel was airtightened by wrapping the entirety thereof with aluminum foil, and then heated at 100° C. for 1 hour (heat-aging step). After being heated, the semidry product had a material temperature of 95° C. and a water content of 23 weight %. Thereafter, the lumpish aggregate was spread onto a wire gauze again, and then finish-dried at 150° C. for 30 minutes with the through-flow batch type drying oven (finish-drying step), thus obtaining a dried product having a water content of 7 weight %. This product was pulverized, and then classified. Measurement was made about the absorption capacity under no load, the extractable content, and the residual monomer content of the resultant powder of 500~300 μm.

(EXAMPLE 2)

Measurement was made about the properties of a polymer as obtained in the same way as of Example 1 except that the particulate hydrogel was changed to the particulate hydrogel resultant from Production Example 2.

The material temperature and the water content were 70° C. and 25 weight % respectively after the partial drying step; and the material temperature and the water content were 95° C. and 23 weight % respectively after the heat-aging step; and the water content was 7 weight % after the finish-drying step.

(EXAMPLE 3)

Measurement was made about the properties of a polymer as obtained in the same way as of Example 1 except that the particulate hydrogel was changed to the particulate hydrogel resultant from Production Example 3.

The material temperature and the water content were 73° C. and 24 weight % respectively after the partial drying step; and the material temperature and the water content were 96° C. and 22 weight % respectively after the heat-aging step; and the water content was 6 weight % after the finish-drying step.

(EXAMPLE 4)

Measurement was made about the properties of a polymer as obtained in the same way as of Example 1 except that the particulate hydrogel was changed to the particulate hydrogel resultant from Production Example 4.

The material temperature and the water content were 72° C. and 25 weight % respectively after the partial drying step; and the material temperature and the water content were 96°

C. and 24 weight % respectively after the heat-aging step; and the water content was 7 weight % after the finish-drying step.

(EXAMPLE 5)

Measurement was made about the properties of a polymer as obtained in the same way as of Example 1 except that the particulate hydrogel was changed to the particulate hydrogel resultant from Production Example 5.

The material temperature and the water content were 72° C. and 25 weight % respectively after the partial drying step; and the material temperature and the water content were 95° C. and 25 weight % respectively after the heat-aging step; and the water content was 6 weight % after the finish-drying step.

(EXAMPLE 6)

Measurement was made about the properties of a polymer as obtained in the same way as of Example 1 except that the particulate hydrogel was changed to the particulate hydrogel resultant from Production Example 6.

The material temperature and the water content were 71° C. and 24 weight % respectively after the partial drying step; and the material temperature and the water content were 96° C. and 23 weight % respectively after the heat-aging step; and the water content was 7 weight % after the finish-drying step.

(EXAMPLE 7)

Measurement was made about the properties of a polymer as obtained in the same way as of Example 1 except that the particulate hydrogel was changed to the particulate hydrogel resultant from Production Example 7.

The material temperature and the water content were 70° C. and 25 weight % respectively after the partial drying step; and the material temperature and the water content were 97° C. and 24 weight % respectively after the heat-aging step; and the water content was 7 weight % after the finish-drying step.

(EXAMPLE 8)

The aggregated semidry product, resultant from the partial drying step in Example 1, was placed into a stainless autoclave, which was then airtightened and then heated at 120° C. for 12 minutes. After being heated, the semidry product had a material temperature of 118° C. and a water content of 23 weight %. Thereafter, the lumpish aggregate was spread onto a wire gauze again, and then finish-dried at 150° C. for 30 minutes with the through-flow batch type drying oven, thus obtaining a dried product having a water content of 7 weight %. This product was pulverized, and then classified. Measurement was made about the absorption capacity under no load, the extractable content, and the residual monomer content of the resultant powder of 500~300 μm.

(COMPARATIVE EXAMPLE 1)

An amount of 1 kg of the particulate hydrogel as obtained in Production Example 1 was statically dried for 15 minutes at a wind speed of 1 m/sec and a temperature of 80° C. with a through-flow batch type drying oven (71-S6, made by Satake Kagaku Kikai Kogyo Co., Ltd.). A thermometer was stuck into the central portion of the resultant lumpish aggregate to measure the material temperature, which was 40° C. In addition, the water content was 50 weight %. Next, the resultant aggregated semidry product was placed into a stainless beaker, and this vessel was airtightened by wrapping the entirety thereof with aluminum foil, and then heated at 100° C. for 1 hour. After being heated, the semidry product had a material temperature of 90° C. and a water content of 45 weight %. Thereafter, the lumpish aggregate was spread onto a wire gauze again, and then finish-dried at 150° C. for 30 minutes with the through-flow batch type drying oven, thus obtaining a dried product having a water content of 7 weight %. This product was pulverized, and then classified. Measurement was made about the absorption capacity under no load, the extractable content, and the residual monomer content of the resultant powder of 500~300 μm.

(COMPARATIVE EXAMPLE 2)

An amount of 1 kg of the particulate hydrogel as obtained in Production Example 1 was statically dried for 30 minutes at a wind speed of 1 m/sec and a temperature of 80° C. with a through-flow batch type drying oven (71-S6, made by Satake Kagaku Kikai Kogyo Co., Ltd.). A thermometer was stuck into the central portion of the resultant lumpish aggregate to measure the material temperature, which was 80° C. In addition, the water content was 10 weight %. Next, the resultant aggregated semidry product was placed into a stainless beaker, and this vessel was airtightened by wrapping the entirety thereof with aluminum foil, and then heated at 100° C. for 1 hour. After being heated, the semidry product had a material temperature of 98° C. and a water content of 9 weight %. Thereafter, the lumpish aggregate was spread onto a wire gauze again, and then finish-dried at 150° C. for 30 minutes with the through-flow batch type drying oven, thus obtaining a dried product having a water content of 6 weight %. This product was pulverized, and then classified. Measurement was made about the absorption capacity under no load, the extractable content, and the residual monomer content of the resultant powder of 500~300 μm.

(COMPARATIVE EXAMPLE 3)

An amount of 1 kg of the particulate hydrogel as obtained in Production Example 1 was statically dried for 10 minutes at a wind speed of 1 m/sec and a temperature of 180° C. with a through-flow batch type drying oven (71-S6, made by Satake Kagaku Kikai Kogyo Co., Ltd.). A thermometer was stuck into the central portion of the resultant lumpish aggregate to measure the material temperature, which was 95° C. In addition, the water content was 25 weight %. Next, the resultant aggregated semidry product was, placed into a stainless beaker, and this vessel was airtightened by wrapping the entirety thereof with aluminum foil, and then heated at 100° C. for 1 hour. After being heated, the semidry product had a material temperature of 98° C. and a water content of 23 weight %. Thereafter, the lumpish aggregate was spread onto a wire gauze again, and then finish-dried at 150° C. for 30 minutes with the through-flow batch type drying oven, thus obtaining a dried product having a water content of 7 weight %. This product was pulverized, and then classified. Measurement was made about the absorption capacity under no load, the extractable content, and the residual monomer content of the resultant powder of 500~300 μm.

(COMPARATIVE EXAMPLE 4)

An amount of 1 kg of the particulate hydrogel as obtained in Production Example 1 was statically dried for 20 minutes at a wind speed of 1 m/sec and a temperature of 80° C. with a through-flow batch type drying oven (71-S6, made by Satake Kagaku Kikai Kogyo Co., Ltd.). A thermometer was stuck into the central portion of the resultant lumpish aggregate to measure the material temperature, which was 70° C. In addition, the water content was 25 weight %. Next, the resultant aggregated semidry product was placed into a stainless autoclave, and then heated at 140° C. for 8 minutes. After being heated, the semidry product had a material temperature of 125° C. and a water content of 22 weight %. Thereafter, the lumpish aggregate was spread onto a wire gauze again, and then finish-dried at 150° C. for 30 minutes with the through-flow batch type drying oven, thus obtaining a dried product having a water content of 6 weight %. This product was pulverized, and then classified. Measurement was made about the absorption capacity under no load, the extractable content, and the residual monomer content of the resultant powder of 500~300 μm.

(COMPARATIVE EXAMPLE 5)

An amount of 1 kg of the particulate hydrogel as obtained in Production Example 1 was statically dried for 40 minutes at a wind speed of 1 m/sec and a temperature of 170° C. with a through-flow batch type drying oven (71-S6, made by Satake Kagaku Kikai Kogyo Co., Ltd.), thus obtaining a dried product having a water content of 6 weight %. This product was pulverized, and then classified. Measurement was made about the absorption capacity under no load, the extractable content, and the residual monomer content of the resultant powder of 500~300 μm.

(COMPARATIVE EXAMPLE 6)

A dried product having a water content of 6 weight % was obtained in the same way as of Comparative Example 5 except that the particulate hydrogel was changed to the particulate hydrogel resultant from Production Example 2. This product was pulverized, and then classified. Measurement was made about the properties of the resultant powder of 500~300 μm.

(COMPARATIVE EXAMPLE 7)

A dried product having a water content of 6 weight % was obtained in the same way as of Comparative Example 5 except that the particulate hydrogel was changed to the particulate hydrogel resultant from Production Example 3. This product was pulverized, and then classified. Measurement was made about the properties of the resultant powder of 500~300 μm.

(COMPARATIVE EXAMPLE 8)

A dried product having a water content of 7 weight % was obtained in the same way as of Comparative Example 5 except that the particulate hydrogel was changed to the particulate hydrogel resultant from Production Example 4. This product was pulverized, and then classified. Measurement was made about the properties of the resultant powder of 500~300 μm.

(COMPARATIVE EXAMPLE 9)

A dried product having a water content of 6 weight % was obtained in the same way as of Comparative Example 5 except that the particulate hydrogel was changed to the particulate hydrogel resultant from Production Example 5. This product was pulverized, and then classified. Measurement was made about the properties of the resultant powder of 500~300 μm.

(COMPARATIVE EXAMPLE 10)

A dried product having a water content of 6 weight % was obtained in the same way as of Comparative Example 5 except that the particulate hydrogel was changed to the particulate hydrogel resultant from Production Example 6. This product was pulverized, and then classified. Measurement was made about the properties of the resultant powder of 500~300 μm.

(COMPARATIVE EXAMPLE 11)

A dried product having a water content of 6 weight % was obtained in the same way as of Comparative Example 5 except that the particulate hydrogel was changed to the particulate hydrogel resultant from Production Example 7. This product was pulverized, and then classified. Measurement was made about the properties of the resultant powder of 500~300 μm.

(COMPARATIVE EXAMPLE 12)

An amount of 1 kg of the particulate hydrogel as obtained in Production Example 1 was statically dried for 15 minutes at a wind speed of 1 m/sec and a temperature of 80° C. with a through-flow batch type drying oven (71-S6, made by Satake Kagaku Kikai Kogyo Co., Ltd.). A thermometer was stuck into the central portion of the resultant lumpish aggregate to measure the material temperature, which was 40° C. In addition, the water content was 50 weight %. Next, the resultant aggregated semidry product was treated with a microwave oven at 500 w for 3 minutes. After being heated, the semidry product had a material temperature of 95° C. and a water content of 27 weight %. Thereafter, the lumpish aggregate was spread onto a wire gauze again, and then finish-dried at 150° C. for 30 minutes with the through-flow batch type drying oven, thus obtaining a dried product having a water content of 6 weight %. This product was pulverized, and then classified. Measurement was made about the absorption capacity under no load, the extractable content, and the residual monomer content of the resultant powder of 500~300 μm.

(COMPARATIVE EXAMPLE 13)

An amount of 1 kg of the particulate hydrogel as obtained in Production Example 1 was statically dried for 20 minutes at a wind speed of 1 m/sec and a temperature of 80° C. with a through-flow batch type drying oven (71-S6, made by Satake Kagaku Kikai Kogyo Co., Ltd.). A thermometer was stuck into the central portion of the resultant lumpish aggregate to measure the material temperature, which was 70° C. In addition, the water content was 25 weight %. Next, the resultant aggregated semidry product was treated with a microwave oven at 500 w for 3 minutes. After being heated, the semidry product had a material temperature of 98° C. and a water content of 15 weight %. Thereafter, the lumpish aggregate was spread onto a wire gauze again, and then finish-dried at 150° C. for 30 minutes with the through-flow batch type drying oven, thus obtaining a dried product having a water content of 6 weight %. This product was pulverized, and then classified. Measurement was made about the absorption capacity under no load, the extractable content, and the residual monomer content of the resultant powder of 500~300 μm.

(COMPARATIVE EXAMPLE 14)

The drying process was carried out in the same way as of Comparative Example 13 except that the aggregated semidry product was treated with a microwave oven at 1,500 w for 9 minutes. The resultant dried product was pulverized, and then classified. Measurement was made about the absorption capacity under no load, the extractable content, and the residual monomer content of the resultant powder of 500~300 μm.

After the heating with the microwave oven, the material temperature was 98° C., and the water content was 5 weight %. In addition, the dried product resultant from the finish-drying step had a water content of 4 weight %. In addition, the semidry product, as got out of the microwave oven, had a partially scorched surface and gave out a foul smell.

(COMPARATIVE EXAMPLE 15)

An amount of 1 kg of the particulate hydrogel as obtained in Production Example 1 was dried until the water content reduced to 20 weight % by causing a hot wind, comprising a mixed gas of water vapor and air and having a temperature of 120° C. and a dew point of 80° C., to blow the hydrogel at a wind speed of 1 m/sec with a through-flow batch type drying oven (71-S6, made by Satake Kagaku Kikai Kogyo Co., Ltd.). Thereafter, the hydrogel was further dried until the water content reduced to 6 weight % with an unhumidified hot wind having a temperature of 180° C., a dew point of 5° C., and a wind speed of 1.0 m/sec, and then the dried hydrogel was pulverized and then classified. Measurement was made about the absorption capacity under no load, the extractable content, and the residual monomer content of the resultant powder of 500~300 μm.

(COMPARATIVE EXAMPLE 16)

An amount of 1 kg of the particulate hydrogel as obtained in Production Example 1 was dried by causing a hot wind, comprising a mixed gas of water vapor and air and having a temperature of 130° C. and a dew point of 80° C., to blow the hydrogel for 15 minutes at a wind speed of 1 m/sec with a through-flow batch type drying oven (71-S6, made by Satake Kagaku Kikai Kogyo Co., Ltd.). Thereafter, the hydrogel was further dried until the water content reduced to 6 weight % by causing an unhumidified hot wind, having a temperature of 160° C., a dew point of 5° C., and a wind speed of 1.0 m/sec, to blow the hydrogel for 50 minutes, and then the dried hydrogel was pulverized and then classified. Measurement was made about the absorption capacity under no load, the extractable content, and the residual monomer content of the resultant powder of 500~300 μm.

TABLE 1

|  | Absorption capacity under no load (g/g) | Extractable content (%) | Residual monomer content (ppm) | Water-absorbent resin used | Absorption capacity change ratio under no load (%) | Extractable content change ratio (%) |
| --- | --- | --- | --- | --- | --- | --- |
| Prod. Ex. 1 | 37.3 | 2.7 | 42,000 | — | — | — |
| Prod. Ex. 2 | 38.5 | 3.1 | 33,000 | — | — | — |
| Prod. Ex. 3 | 39.0 | 3.4 | 21,000 | — | — | — |
| Prod. Ex. 4 | 40.0 | 4.3 | 13,000 | — | — | — |
| Prod. Ex. 5 | 37.5 | 2.5 | 47,000 | — | — | — |
| Prod. Ex. 6 | 44.6 | 3.3 | 43,000 | — | — | — |
| Prod. Ex. 7 | 27.0 | 2.0 | 10,000 | — | — | — |
| Ex. 1 | 38.2 | 3.4 | 130 | Prod. Ex. 1 | 0 | 26 |
| Ex. 2 | 39.7 | 4.1 | 170 | Prod. Ex. 2 | 3 | 32 |
| Ex. 3 | 41.5 | 4.9 | 80 | Prod. Ex. 3 | 7 | 44 |
| Ex. 4 | 42.7 | 6.3 | 95 | Prod. Ex. 4 | 7 | 47 |
| Ex. 5 | 39.0 | 4.7 | 90 | Prod. Ex. 5 | 4 | 88 |
| Ex. 6 | 46.6 | 5.0 | 100 | Prod. Ex. 6 | 4 | 52 |
| Ex. 7 | 27.8 | 2.3 | 50 | Prod. Ex. 7 | 3 | 30 |
| Ex. 8 | 38.0 | 3.2 | 290 | Prod. Ex. 1 | 2 | 60 |
| Comp. Ex. 1 | 43.4 | 4.6 | 15,000 | Prod. Ex. 1 | 16 | 70 |
| Comp. Ex. 2 | 39.8 | 4.8 | 960 | Prod. Ex. 1 | 7 | 78 |
| Comp. Ex. 3 | 42.0 | 6.8 | 840 | Prod. Ex. 1 | 13 | 152 |
| Comp. Ex. 4 | 41.8 | 6.2 | 202 | Prod. Ex. 1 | 12 | 130 |
| Comp. Ex. 5 | 51.5 | 14.0 | 750 | Prod. Ex. 1 | 38 | 419 |
| Comp. Ex. 6 | 51.5 | 15.0 | 580 | Prod. Ex. 2 | 34 | 384 |
| Comp. Ex. 7 | 53.0 | 16.0 | 520 | Prod. Ex. 3 | 36 | 371 |
| Comp. Ex. 8 | 52.0 | 17.0 | 450 | Prod. Ex. 4 | 30 | 342 |
| Comp. Ex. 9 | 52.5 | 13.2 | 1,100 | Prod. Ex. 5 | 40 | 428 |
| Comp. Ex. 10 | 65.1 | 30.0 | 700 | Prod. Ex. 6 | 46 | 809 |
| Comp. Ex. 11 | 33.8 | 8.2 | 390 | Prod. Ex. 7 | 25 | 210 |
| Comp. Ex. 12 | 41.4 | 4.5 | 3,700 | Prod. Ex. 1 | 11 | 67 |
| Comp. Ex. 13 | 36.6 | 3.6 | 3,400 | Prod. Ex. 1 | 3 | 33 |
| Comp. Ex. 14 | 48.0 | 18.0 | 300 | Prod. Ex. 1 | 29 | 567 |
| Comp. Ex. 15 | 48.5 | 13.0 | 280 | Prod. Ex. 1 | 30 | 381 |
| Comp. Ex. 16 | 44.1 | 7.1 | 280 | Prod. Ex. 1 | 18 | 163 |

Prod. Ex.: Production Example
Ex.: Example
Comp. Ex.: Comparative Example (EXAMPLE 9)

The dried product resultant from Example 6, was pulverized with a roll mill and then classified to obtain particles which passed through a sieve of 850 μm and remained on a sieve of 150 μm. The resultant particles had a particle diameter distribution of: 850 μm-on=0 weight %; 600~850

μm=32 weight %; 300~600 μm=53 weight %; and 150~300 μm=15 weight %.

A surface-treating solution, comprising ethylene glycol diglycidyl ether/propylene glycol/water/isopropyl alcohol= 0.03/0.5/3/1 weight parts, was mixed with 100 weight parts of the above-obtained particles, and the resultant mixture was stirred for about 40 minutes in an oil bath of 212° C., thus obtaining a surface-crosslinked water-absorbent resin, which had an absorption capacity of 40 (g/g) under no load and an absorption capacity of 38 (g/g) under the load.

(COMPARATIVE EXAMPLE 17)

A surface-treated water-absorbent resin was obtained in the same way as of Example 9 except that the dried product was changed to the dried product resultant from Comparative Example 10. This water-absorbent resin had an absorption capacity of 50 (g/g) under no load and an absorption capacity of 30 (g/g) under the load.

As is evident from the results of Example 9 and Comparative Example 17, the water-absorbent resin is dried without being deteriorated in the present invention, therefore the resultant dried water-absorbent resin exhibits excellent absorbency under the load.

(EXAMPLE 10)

The swelling pressure of the particles, as classified into 500~300 μm, resultant from Example 6, was measured. As a result, it was 23 kdyne/cm$^2$. On the other hand, the swelling pressure of the particles, as classified into 500~300 μm, resultant from Comparative Example 10, was 7 kdyne/cm$^2$.

As is evident from this result, the water-absorbent resin is dried without being deteriorated in the present invention, therefore the resultant dried water-absorbent resin exhibits high swelling pressure.

(EXAMPLE 11)

The swelling pressure of the particles, as classified into 500~300 μm, resultant from Example 7, was measured. As a result, it was 53 kdyne/cm$^2$. On the other hand, the swelling pressure of the particles, as classified into 500~300 μm, resultant from Comparative Example 11, was 41 kdyne/cm$^2$.

As is evident from this result, the water-absorbent resin is dried without being deteriorated in the present invention, therefore the resultant dried water-absorbent resin exhibits high swelling pressure.

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A production process for a hydrophilic polymer, comprising the steps of: obtaining a hydrogel polymer by aqueous solution polymerization of a hydrophilic monomer; and then drying the hydrogel polymer;

with the production process being characterized in that the drying step includes the steps of:

partially drying the hydrogel polymer under normal pressure at a material temperature of not higher than 90° C. until the water content of the hydrogel polymer reduces to 15~40 weight %; and then heat-aging the hydrogel polymer by keeping the hydrogel polymer for not shorter than 10 minutes in a state where the change of the water content of the hydrogel polymer is within 5 weight % and where the material temperature is in the range of 70~120° C.; and then finish-drying the hydrogel polymer until the water content of the hydrogel polymer reduces to a desired value.

2. A production process according to claim 1, wherein the water content of the hydrogel polymer as obtained by the polymerization is in the range of 80~60 weight %.

3. A production process according to claim 1, wherein the aqueous solution polymerization of the hydrophilic monomer involves the use of a persulfate salt.

4. A production process according to claim 1, wherein the hydrogel polymer as obtained by the polymerization has a residual monomer content of not lower than 10,000 ppm.

5. A production process for a hydrophilic polymer, comprising the steps of: obtaining a hydrogel polymer by aqueous solution polymerization of a hydrophilic monomer; and then drying the hydrogel polymer;

with the production process being characterized in that the drying step includes the steps of:

partially drying the hydrogel polymer under normal pressure at a material temperature of not higher than 90° C. until the water content of the hydrogel polymer reduces to 15~40 weight %; and then heat-aging the hydrogel polymer by keeping the hydrogel polymer for not shorter than 10 minutes in a state where the water content of the hydrogel polymer is in the range of 15~40 weight % and where the material temperature is in the range of 70~120° C.; and then finish-drying the hydrogel polymer until the water content of the hydrogel polymer reduces to a desired value.

6. A production process according to claim 5, wherein the water content of the hydrogel polymer as obtained by the polymerization is in the range of 80~60 weight %.

7. A production process according to claim 5, wherein the aqueous solution polymerization of the hydrophilic monomer involves the use of a persulfate salt.

8. A production process according to claim 5, wherein the hydrogel polymer as obtained by the polymerization has a residual monomer content of not lower than 10,000 ppm.

9. A production process for a water-absorbent resin, comprising the steps of: obtaining a hydrogel polymer by aqueous solution polymerization of a hydrophilic monomer; and then drying the hydrogel polymer;

with the production process being characterized in that the drying step involves an absorption capacity change ratio of not higher than 10 under no load and an extractable content change ratio of not higher than 100, and gives the water-absorbent resin with a residual monomer content of not higher than 300 ppm.

* * * * *

UNITED STATES PATENT AND TRADEMARK OFFICE
CERTIFICATE OF CORRECTION

PATENT NO.    : 6,207,796 B1                                                      Page 1 of 1
DATED         : March 27, 2001
INVENTOR(S)   : Yorimichi Dairoku et al.

It is certified that error appears in the above-identified patent and that said Letters Patent is hereby corrected as shown below:

Title page,
Please add the "Foreign Application Priority Data" to column 1, as follows:

-- (30) Foreign Application Priority Data

Nov. 18, 1998   (JP) ...............................................................10-328236 --

Signed and Sealed this

Twenty-fifth Day of December, 2001

Attest:

JAMES E. ROGAN
*Attesting Officer*     *Director of the United States Patent and Trademark Office*